United States Patent [19]

Rouse

[11] Patent Number: 5,144,293
[45] Date of Patent: Sep. 1, 1992

[54] SERIAL LINK COMMUNICATION SYSTEM WITH CASCADED SWITCHES

[75] Inventor: Gerlad L. Rouse, Round Rock, Tex.

[73] Assignee: International Business Machines Corporation, Armonk, N.Y.

[21] Appl. No.: 629,748

[22] Filed: Dec. 18, 1990

[51] Int. Cl.$^5$ .............................................. H04Q 3/00
[52] U.S. Cl. ........................ 340/825.02; 340/825.05; 340/825.80; 340/826; 370/60; 370/16.1
[58] Field of Search ............. 340/825.02, 826, 825.05, 340/825.8; 370/58.1, 58.2, 58.3, 16, 60, 16.1

[56] References Cited

U.S. PATENT DOCUMENTS

| | | | |
|---|---|---|---|
| 4,605,928 | 8/1986 | Georgiou | 340/825.94 |
| 4,630,045 | 12/1986 | Georgiou | 340/825.8 |
| 4,633,394 | 12/1986 | Georgiou | 340/825.51 |
| 4,635,250 | 1/1987 | Georgiou | 340/825.79 |
| 4,752,777 | 6/1988 | Franaszek | 340/825.8 |
| 4,763,122 | 8/1988 | Franaszek | 340/825.79 |
| 4,763,329 | 8/1988 | Green | 370/16 |
| 4,829,511 | 5/1989 | Georgiou | 340/825.82 |
| 4,876,550 | 12/1989 | Hino et al. | 340/825.05 |
| 4,899,142 | 2/1990 | Nakayashi et al. | 340/825.05 |
| 4,929,940 | 5/1990 | Franaszek et al. | 340/825.02 |
| 5,072,217 | 12/1991 | Georgiou et al. | 340/825.79 |

OTHER PUBLICATIONS

IBM: Technical Disclosure Bulletin vol. 18 No. 9 Feb. 1976.
"Understanding Data Communications", Friend et al, 1984 pp. 2-18 and 2-19.

Primary Examiner—Donald J. Yusko
Assistant Examiner—Brian Zimmerman
Attorney, Agent, or Firm—Tyson Tom E.; Keith Stephens

[57] ABSTRACT

A serial link communications system is provided including a first and second switch where each switch is connected to a plurality of devices providing a serial communications link channel between any of the devices connected to that switch. Also, each switch includes an interswitch connection providing a serial link communications channel between any device connected to the first switch and any device connected to the second switch.

13 Claims, 11 Drawing Sheets

SERIAL LINK COMMUNICATION SYSTEM WITH CASCADED SWITCHES

RELATED PATENT APPLICATIONS

This application is related to copending U.S. patent application Ser. No. 07/629,511 filed Dec. 18, 1990 and copending U.S. patent application Ser. No. 07/629,864 filed Dec. 18, 1990.

1. Technical Field

This invention relates to data processing communications systems and, more specifically, to a serial link data processing communications system including cascaded switches.

2. Background Art

Communications between elements in a data processing system is extremely important. This is especially true in a high performance data processing system. Such high performance data processing systems include engineering workstations that are interconnected to provide information among themselves. Several types of data processing communication systems have been provided in the past. These include telephone analog systems, and, more recently, packet switching systems. The present invention employs the serial link network including multiple cross point switches. Accordingly, communications between two workstations can be accomplished in such a manner that a communications channel is actually provided between the workstations so that a continual data transfer is possible.

The prior art illustrates several types of switches providing communications interconnection. One is illustrated in U.S. Pat. No. 4,864,558, entitled "Self Routing Switch", which illustrates a switch having a series of switching stages. Each switching stage includes a plurality of cascade connected store/switch elements. The store/switch elements transfer information directly outward or shifted outwardly to another corresponding output link according to routing information. In this invention, the routing is made possible by the bit information in the data.

U.S. Pat. No. 4,833,468, entitled "Layered Network", illustrates a layered switching network or a switching network having a succession of stages, where switch in one stage provides the message request to a switch in the next successive stage based upon information in the message request itself.

U.S. Pat. No. 4,032,899, entitled "Apparatus and Method for Switching of Data" is a packet information disclosure. Accordingly packets of data are sent from one node to another node. The transmission of the packets do not require that an existing communications channel exist between nodes, but that the packet be transferred over a period of time. This patent addresses the store and forward technique of temporarily storing a packet until it can be forwarded to a next port for transfer to the destination node.

Likewise, U.S. Pat. No. 4,623,996, entitled "Packet Switched Multiple Queue N X M Switch Node and Processing Method", teaches the transfer of data packets including routing tags. Queues are provided at intermediate ports for the temporary storing for data packets that may be stored and later forwarded.

IBM Technical Disclosure Bulletin, Vol. 18, No. 9, February, 1976, pp. 3059-3062, entitled "Explicit Path Routing for Switching Network", discloses a packet switching scheme, where the packet itself includes header information that suggests inputs for a routing routine where the routing routine is an adaptive routing algorithm that determines the path for the packet transmission.

IBM Technical Disclosure Bulletin, Vol. 18, No. 6, November, 1975, pp. 1787-1788, entitled "Queueing Technique for Bandwidth Allocation in a Packet Switched Network", discloses a packet data transmission technique that includes queues along the communications node path wherein the data that is queued is given a priority based on which queue it is stored. In that manner, the higher priority messages that need to be transferred quickly can be stored in queues that will be transmitted with more frequently than in the slower transmitted queues in the node.

IBM Technical Disclosure Bulletin, Vol. 18, No. 6, November, 1975, p. 1784, entitled "Prioritized Adaptive Routing in a Packet Switch Network", discusses the routing of packets based upon priority. The higher the priority will determine that the packet is to be transmitted through the fewest number of nodes possible, whereas a lower priority may be transferred through more nodes.

IBM Technical Disclosure Bulletin, Vol. 23, No. 1June, 1980, pp. 286-287, entitled "Block Buffer Overrun Control", discloses a store and forward technique for transmitting packet data.

IBM Technical Disclosure Bulletin, Vol. 18, No. 7, December, 1975, p. 2110, entitled "Traffic Control and Packet Switched Networks", discloses a priority based system for routing packets through nodes.

IBM Technical Disclosure Bulletin, Vol. 18, No. 7, December 1975, p. 2109, entitled "Efficient Data Transfer in Packet Switched Networks", discloses a technique for transferring bulk traffic, where bulk traffic is defined as a large number of messages having a common origin and common destination. In such a situation, the bulk traffic can be identified in control communications in order that an allotment of buffer and channel capacity can be provided for the more efficient flow of this bulk traffic.

Several examples of prior art in telephone switching will now be discussed.

U.S. Pat. Nos. 4,543,653 and 4,550,398, both entitled "Modular Self Routing PCM Switching Network for Distributed-Control Telephone Exchange", disclose pulse coded modulation switching for telephone interconnections.

IBM Technical Disclosure Bulletin, Vol. 28, No. 7, December, 1985, pp. 2763-2766, entitled "Ten Thousand Line Digital Central Office", discloses a digital switching telephone network that is expandable.

IBM Technical Disclosure Bulletin Vol. 25, No. 7, September, 1982, pp. 2231-2232, entitled "Busy Call Diverter", discloses a scheme for forwarding a call made to a busy extension to a voice mail system.

IBM Technical Disclosure Bulletin, Vol. 25, No. 7B, December, 1982, pp. 3956-3960, entitled "Signal Detection Circuit for Peer-to-Peer Rings", discloses a ring communications system where each computer connected to the communications ring receives a message from a preceding located computer. This *IBM Technical Disclosure Bulletin* describes circuitry provided to allow the computer to determine error conditions in received messages.

The object of the present invention is to provide a serial link communications system for connecting two devices within a data processing system. This communication connection provides an ongoing communications channel to provide direct communication from one device to the other.

A further object of the present invention is to provide a digital processing communications system using a serial link and having cascaded switches where a device connected to one switch may directly communicate with a device connected to another switch.

DISCLOSURE OF THE INVENTION

In accordance with the present invention. a serial link communications system is provided that includes a first and second switch where each switch is connected to a plurality of devices providing a serial communications link channel between any of the two devices connected to that switch. Also, each switch includes an inter-switch connection providing a serial link communications channel between any device connected to the first switch and any device connected to the second switch.

BRIEF DESCRIPTION OF THE DRAWING

The foregoing and other objects, aspects and advantages of the invention will be better understood from the following Best Mode for Carrying Out the Invention with reference to the figures listed below, in which.

FIG. G is an event diagram in accordance with the subject invention.

Figure 6:
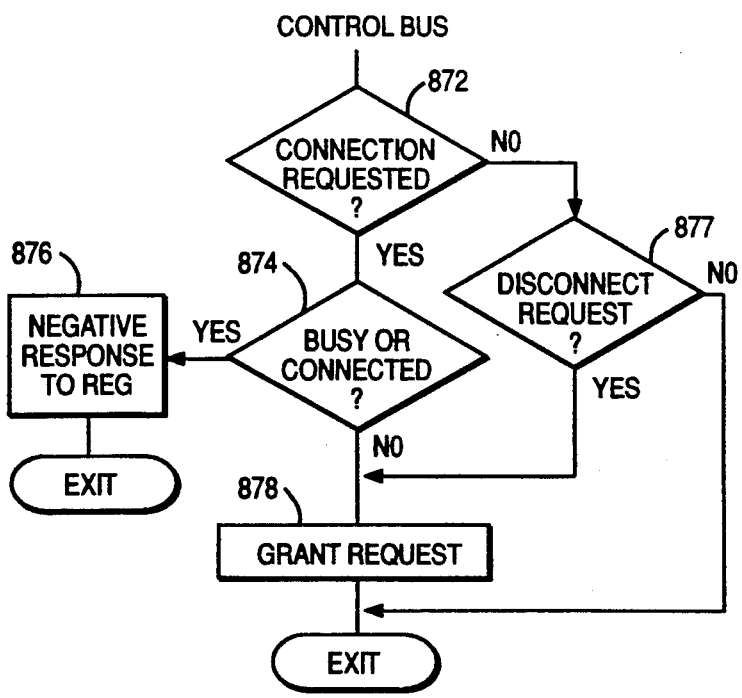
Figure 7:
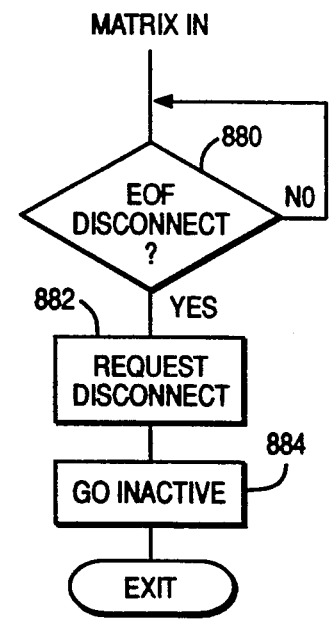
Figure 5:
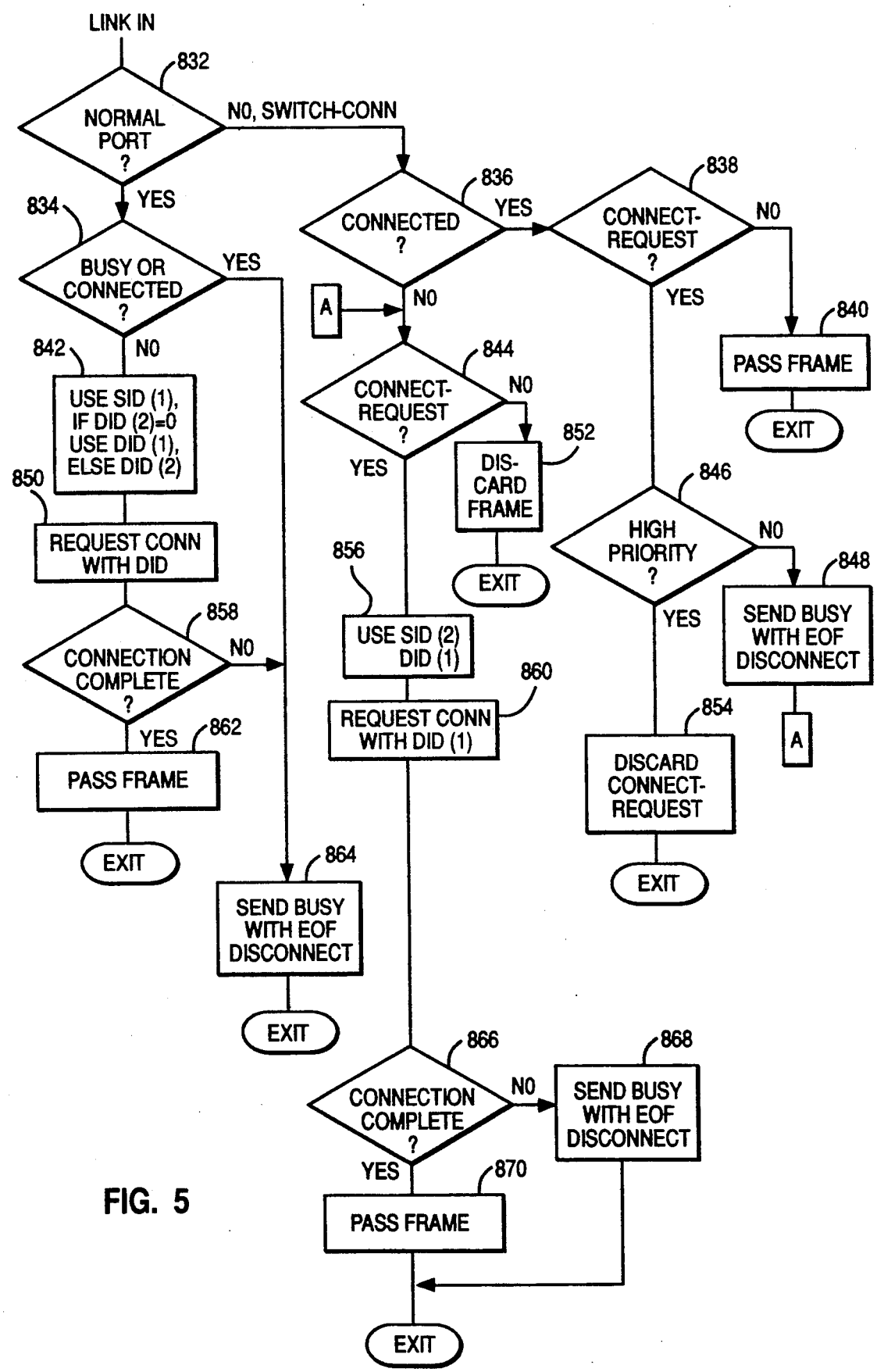

FIG. 5 is a flow diagram illustrating the procedural control of the port for external data received over the link from a connected device;

FIG. 6 is a flow diagram illustrating the control procedures for/the control bus by the port controller; and FIG. 7 is a flow diagram illustrating the control of the port for communications from the matrix switch.

BEST MODE FOR CARRYING OUT THE INVENTION

Figure 1:
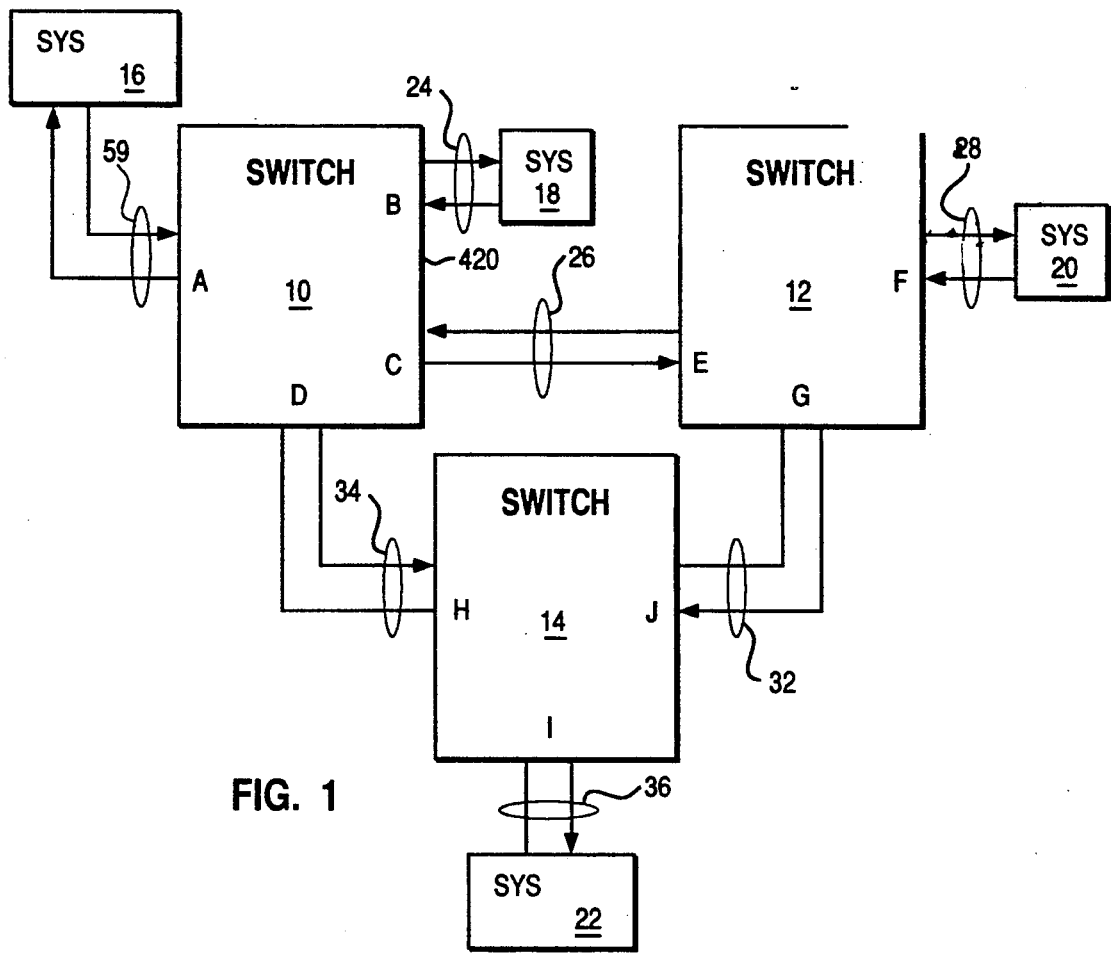
FIG. 1 is a block diagram of a serial link communications system network including cascaded switches.

FIG. 1 is a block diagram illustrating a serial link communications network including four discreet systems connected to three cross point switches. System 16 is connected via a bidirectional serial data link 59 to port A of a cross point switch 10. Cross point switch 10 is also connected to system 18 via a bidirectional serial link 24 through port B. Cross point switch 10 also includes a port C which, through a bidirectional serial link 26, is connected to a second cross point switch 12. Further, cross point switch 10 through port D is interconnected via a bidirectional data link 34 to a third cross point switch 14. Cross point switch 12 is connected through port E to the bidirectional data link 26 to switch 10. Additionally, switch 12 is connected through a bidirectional data link 28 at port F to system 20. Still further, switch 12 is connected at port G through a bidirectional data link 32 to cross point switch 14. Cross point switch 14 is connected to cross point switch 10 through port H. Switch 14 is connected through port J to cross point switch 12. Additionally, cross point switch 14 is connected through port I through the bidirectional data link 36 to system 22. The cross point switch (such as cross point switch 10) provides the capability for a system, such as system 16, to talk directly to system 18 by establishing a direct and complete serial link connection between lines 59 and 24 and a real time communications link is established and data that is sent from system 16 on the bidirectional link 59 is immediately placed on serial link 24 to system 18 without being stored. Likewise, system 16 can also communicate through the cross point switch 10 to cross point switch 12 to provide communications information to the bidirectional serial link 28 to system 20. This is termed a "cascaded switch connection" since two switches. 10 and 12, are interconnected to provide the complete serial link connection between system 16 and system 20.

The operation of the cross point switch 10 in connecting system 16 to system 18 is discussed in detail in co-pending patent application entitled "Cross Point Switch With Distributed Control", Ser. No. 06/629,511, filed Dec. 18, 1990 and copending patent application entitled "Third Party Eavesdropping for Bus Control", Ser. No. 07/629,864, filed Dec. 18, 1990which are herein incorporated by reference.

Figure 2:
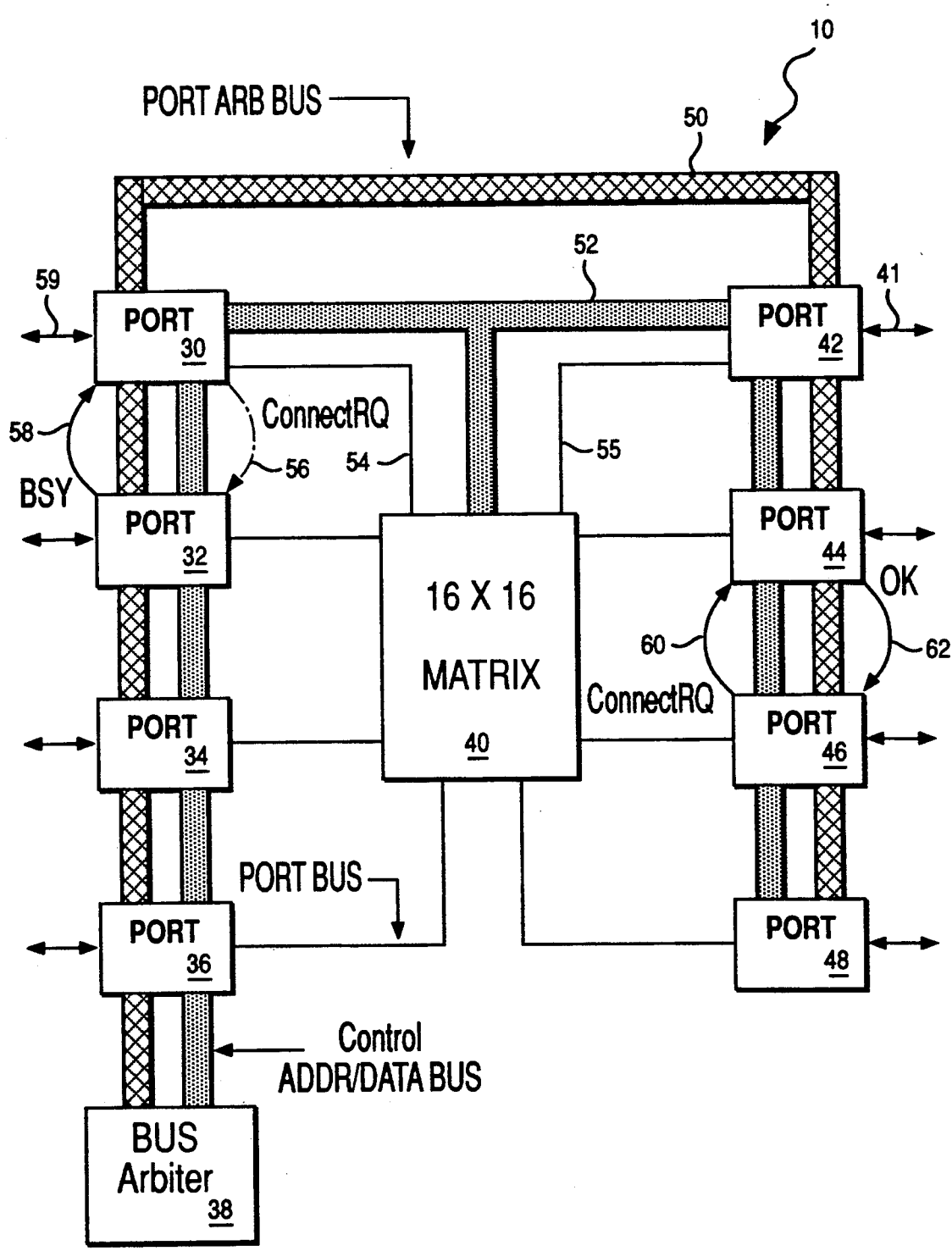
FIG. 2 is a block diagram of a cross point switch.

FIG. 2 is a block diagram of the cross point data switch 10. In the preferred embodiment, a 16×16 switch is provided. For this description only, eight ports of the 16 are shown. Each port 30 is connected to a port arbitration bus 50, port control bus 52 and data transfer lines (such as lines 54 and 55 for ports 30 and 42 respectively). Each of the ports are connected through these data lines to the 16×16 matrix switch 40. The matrix switch 40 can be an off-the-shelf part such as the GIGABIT Logic 10G051, which provides cross point interconnection between ports.

In the preferred embodiment, each port provides an optical-to-electrical conversion in order that the information is passed electrically between ports through the 16×16 matrix 40. Initially, a port, such as 30, may attempt a connection to another port, such as port 32. First, port 30 requests arbitration, That is, port 30 requests a grant on the arbitration bus 50 through the bus arbiter 38. Upon receiving a grant, a connect request is passed over the control bus 52 to port 32. A status is then received. In FIG. 2, an example is illustrated where port 30 is attempting to contact port 32 by sending a request symbolically indicated by the dashed arrow 56. Port 32 sends a busy signal indicated symbolically by the arrow 58 back to port 30 declining the transfer request. Note that during this initial attempt at port-to-port connection, the 16×16 matrix has not been accessed. This is possible by having the control of the switch mechanism distributed among the ports. In other words, it is only after confirmation is received that the data transfer can take place that the switch 40 is involved in the connection between the ports.

The matrix switch 40 is connected to the control bus 52. This may enable the matrix switch 40 to respond to commands directed to it. In the preferred embodiment, the only commands that are directed to the matrix switch 40 are those of a diagnostic nature. During normal operation, the matrix switch 40 merely monitors the control bus 52 and the control communication between ports to determine when connections are to be made or terminated. When connections are made, lines such as 54 are connected to lines such as 55 to allow for data transfers between ports such as port 30 and port 42 without requiring explicit commands to the switch from the ports or from some other control.

The disconnection operation is performed by the matrix switch 40 without any commands from the ports. The matrix switch 40 eavesdrops on the command bus 52 to determine when the disconnection is to be made by examining the commands for a disconnect on the control bus 52. When a termination frame is being sent from one system to another, the matrix switch 40 by monitoring the control bus 52 automatically determines when the connection is to be broken; thus, saving time by not requiring a separate command protocol to tell the matrix switch to disconnect. This is important because the disconnection operation is a high priority, since further connections with either of these ports can only be made when this disconnection occurs.

Switch 10 is additionally connected to another cross point switch 12 through port C. Port C is configured as any port, such as A or B, except that port C includes special control procedures for providing the serial link connection to another cross point switch. These additional controls will be discussed later.

Figure 3:
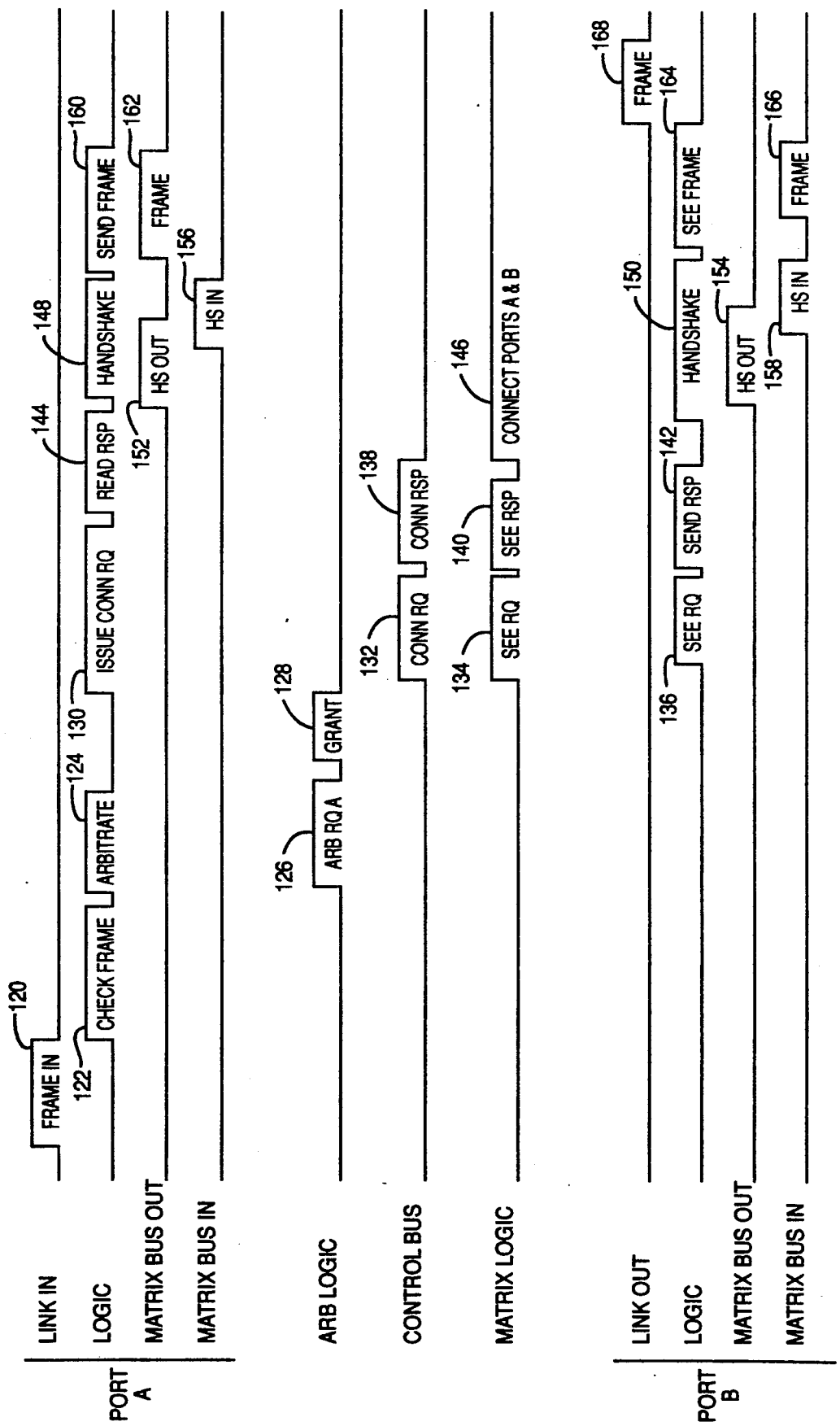
FIG. 3 is an event diagram illustrating normal port-to-port communications.

FIG. 3 is an event diagram illustrating the interconnections of port A and B in switch 10 interconnecting systems 16 and 18. In FIG. 3, a frame is first received by port on bus such as 59 (FIG. 2) at event 120. At event 122, the port logic examines the frame and determines to establish a connection and, at event 124, to arbitrate for the control bus. The bus arbitrator 38 receives the request at event 126 and grants the request at event 128. At that time, the port A logic issues a connect request 130 which includes the port addresses involved on the control bus 52 indicated by event 132. The matrix 40 observes this request at event 134 and latches the addresses of the port while port B logic receives this request at event 136. The port B logic then sends a response 142, which is also observed by the matrix 40 at event 140 over the control bus 52, as illustrated by event 132. This response is read by the port A logic at event 144. In this example, a successful connection is being performed. Therefore, the matrix 40 will provide the interconnection between the serial link interconnection between ports A and B. Port A logic then provides handshake signals with port B over the matrix bus. First the handshake out event 152 and 154 are provided from both ports and then the handshake in events 156 and 158 are provided back from both ports to the opposing ports. Finally, the frame is sent at event 160 and from the matrix bus at event 162 to the matrix in line of port B at event 166 where the port logic examines the frame at event 164. This frame is then provided on the output of the link to the connected device at event 168.

Figure 4A:
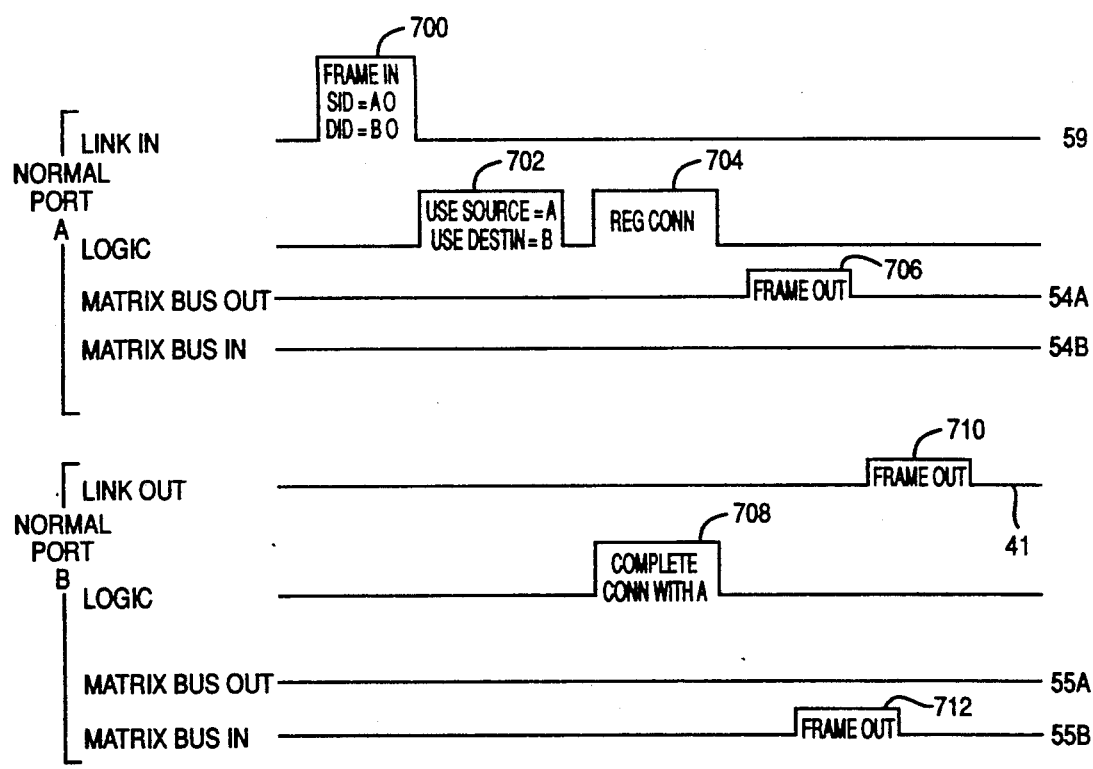
FIG. 4A is an abbreviated event diagram of a normal port-to-port communications as illustrated in FIG. 3.

FIG. 4A is an event diagram illustrating an abbreviated version of the link connections between systems 16 and 18. At event 700, the frame N is received from system 16 by cross point switch 10. The frame in contains a source identification and a destination identification. In the preferred embodiment, the source identification and the destination identification are two words each. In this example, the source identification is "AO". The destination identification is "BO". The port logic in event 702 determines that the source is A port and that the destination is B port. Port A at event 704 requests the connection to port B. This connection is completed at event 708 in a manner previously discussed through the matrix 40. Upon completion, port A sends out the frame at event 706 on the matrix out bus 54A. The frame is received in the matrix bus in line 55B at event 712. Port B then provides this frame to system 18 at event 710.

Figure 4B:
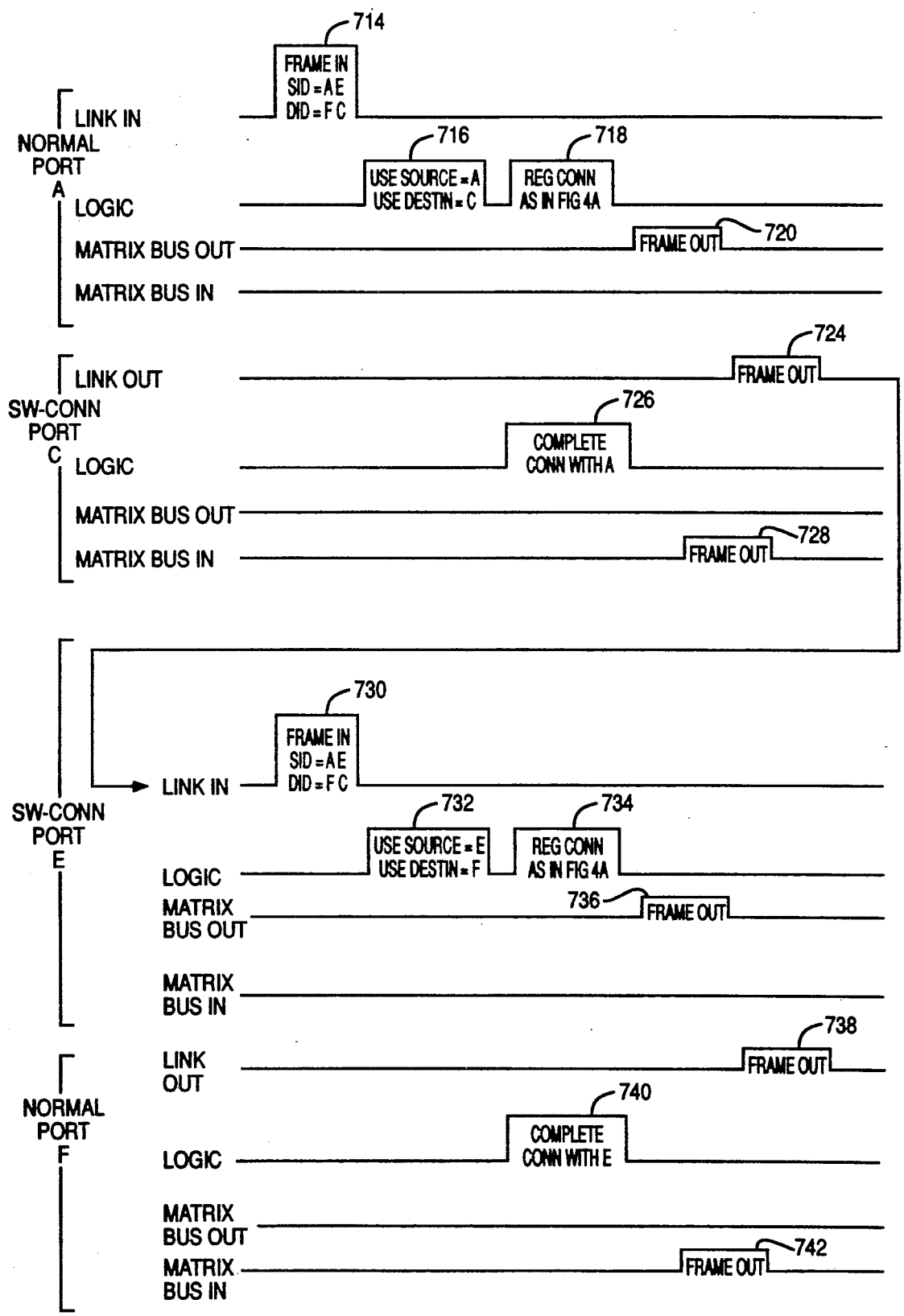
FIG. 4B is an event diagram illustrating a normal communications exchange across a cross point switch-to-cross point switch interconnection.

FIG. 4B is an event diagram illustrating a connection between system 16 through port A of cross point switch 10 to system 20 through port F in cross point switch 12. To accomplish this interconnection, a data connection must be established between cross point switch 10 and cross point switch 12. This is accomplished by interconnecting cross point switch 10 through port C onto to data link 26 to port E of cross point switch 12. FIG. 4B is the event diagram illustrating the establishment of this communications link. At event 714, the data frame is first received at port A containing the source identification "AE" and the destination identification "FC". The source identification "AE" is the identification of the two source ports for the two cross point switches 10 and 12. Port A is the source port for switch 10 and port E is the source port for switch 12. Likewise, the destination identification "FC" designates ports C for switch 10 and port F for switch 12 as the destination ports. Note that a normal port uses SID(1) as the source port and uses DID(2) if DID(2) is not equal to "0" for frames received on its link in. The control logic in port A at event 716 determines to use the source identification A and the destination identification C in order to establish communications at event 718 with port C. At event 726, the communications link is established through the matrix 40, as previously discussed. At this time, at event 720, the frame is then passed out over the matrix to port C at event 728. Port C then passes the frame out at event 724, which is received at event 730 by port E of switch 12 over the bidirectional serial link 26. Note that the source identification and the destination identification is the same received at port E at event 730. However, as will be further discussed, port E operates differently since port E is connected to another cross point switch rather than being connected to a system such as system 16. Therefore, in event 732, the port E control logic designates the source as E and the destination as F in requesting communications in event 734 with port F. Note that a switch connected port uses SID(2) as the source port and uses DID(1) as the destination port. The communications request is completed in event 740 in the control logic of port F. The frame is then transmitted at event 736 in the matrix out bus from port E through the matrix to the matrix in bus at event 742 for port F. Finally, the frame is provided out at event 738 to system 20 over the bidirectional serial link 28 (FIG. 1). It should be understood that port A does not consider a connection complete until a response is received from system 20 indicating a grant of the connection. AT this time, all further transmissions could use a simplified source identification of "AO" and destination identification of "OF". At this time, a continuous connection exists between system 16 and system 20.

Figure 4C:
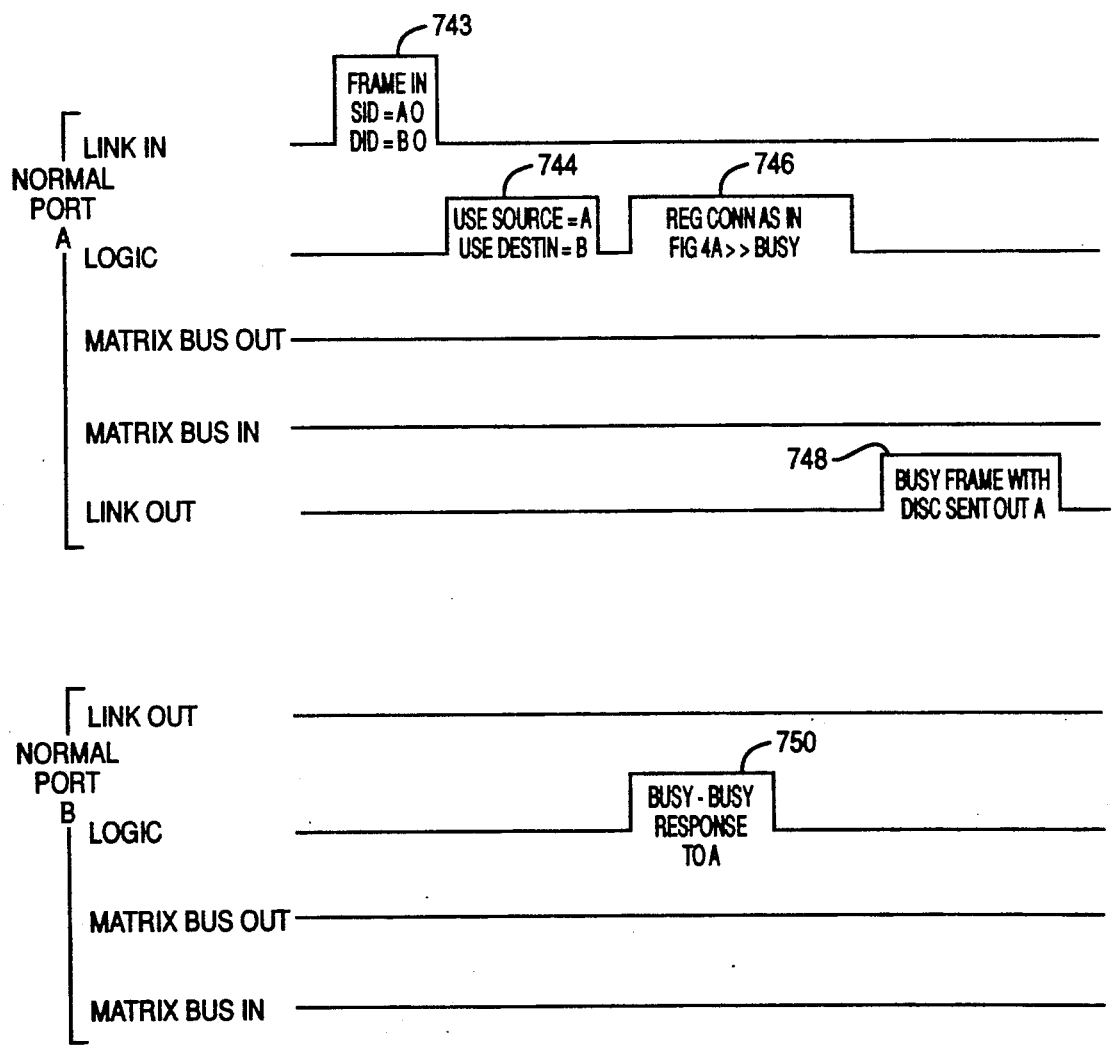
FIG. 4C is an event diagram illustrating a busy condition in a port-to-port communications link through a single cross point switch.

FIG. 4C is an event diagram illustrating an attempt at connecting system 16 to system 18 when system 18 is already busy. This condition would occur when system 18 would already be connected through cross point switch 10 to some other system, such as system 22 through cross point switch 14. When system 16 initiates the communications by providing the data frame in at event 743, the frame includes the source identification and destination identification, as previously discussed in FIG. 4A. The port A logic at event 744 determines that the source is the A port and that the destination is the B port. Then, at event 746, an attempt is made to establish the connection with port B. At event 750, port B determines that it is busy and provides a busy indication back to port A. Therefore, in event 746, the control logic in port A determines that port B is busy and that a communications link cannot be made. Port A provides a busy frame on the link out (the outbound portion of serial link 59) at event 748 to system 16, indicating that a communications link cannot be completed. The busy frame is terminated by a special end of frame delimiter which indicates to port A that a connection does not exist. Where appropriate, this special end of frame also indicates that the port is to disconnect.

Figure 4D:
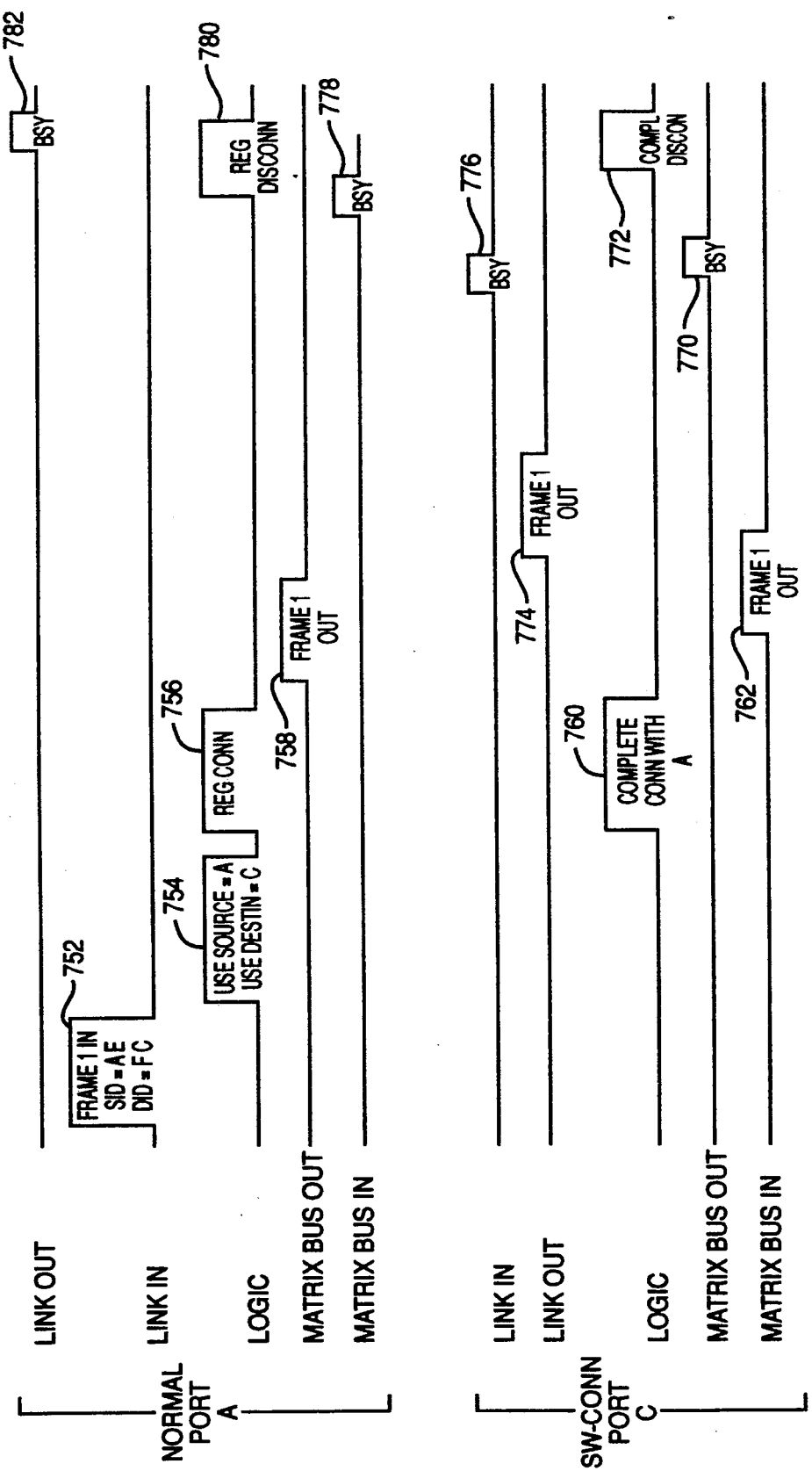
FIG. 4D is an event diagram illustrating a busy condition in a cross point switch-to-cross point switch interconnection.

FIG. 4D is an illustration of an attempt at a switch-to-switch connection between ports when a busy condition exists at the incoming port of the cascaded switch. In other words, referring to FIG. 1, system 16 is attempting to connect with system 20. This connection provides for cross point switch 10 to interconnect ports A and C, and then through port C to E over the serial link connection 26 to switch 12. Switch 12 would then provide the interconnection between ports E and F linking through the serial link 28 to system 20. This is the interconnection discussed in FIG. 4B. However, in this example, port E is busy. At event 752, system 16 is provided the frame to port A. This frame will include the source identification of "AE" and a destination identification of "FC". At event 754, port A logic determines that the source address is A and the destination address is C. The port logic then attempts to establish communications with port C at event 756. This is received by port C logic at event 760 and the communications is completed through the matrix switch 40. At event 758, the frame is sent out through the matrix by port A and is received from the matrix at event 762 by port C. The frame is then relayed out the link side onto the serial link 26 at event 774 to port E of cross point switch 12. Port E receives the frame at event 764. However, port E is currently busy. At event 768, the logic determines that the port is in a busy condition and sends a busy disconnect frame. A busy frame with a disconnect end of frame delimiter is transmitted by the logic in port E at event 768 on its link out at event 766. The busy frame is received by port C on its link in at event 776. The frame is passed on matrix out at event 770 passing through matrix 40 and enters port A at event 778. When port A logic detects the disconnect delimiter at event 780, port A issues a disconnect request to port C. Port C completes the disconnect request at event 772. The matrix monitors this request and removes the matrix connection. Port A passes the frame to its link out at event 782 and delivers the busy frame with end of frame disconnect to system 16.

Figure 4E:
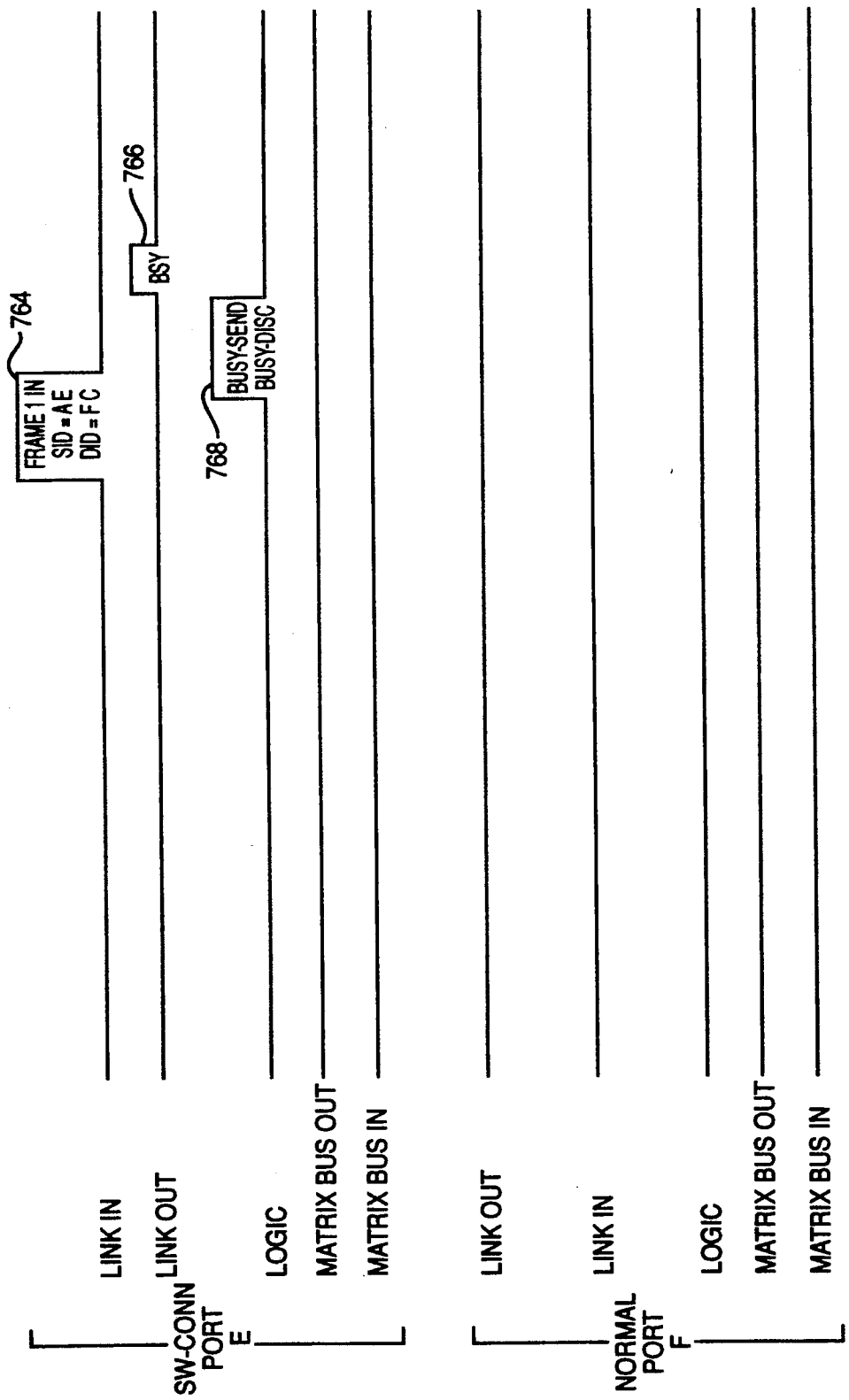
FIGS. 4E is an event diagram illustrating a collision condition in a cross point switch-to-cross point switch connection.
Figure 4F:
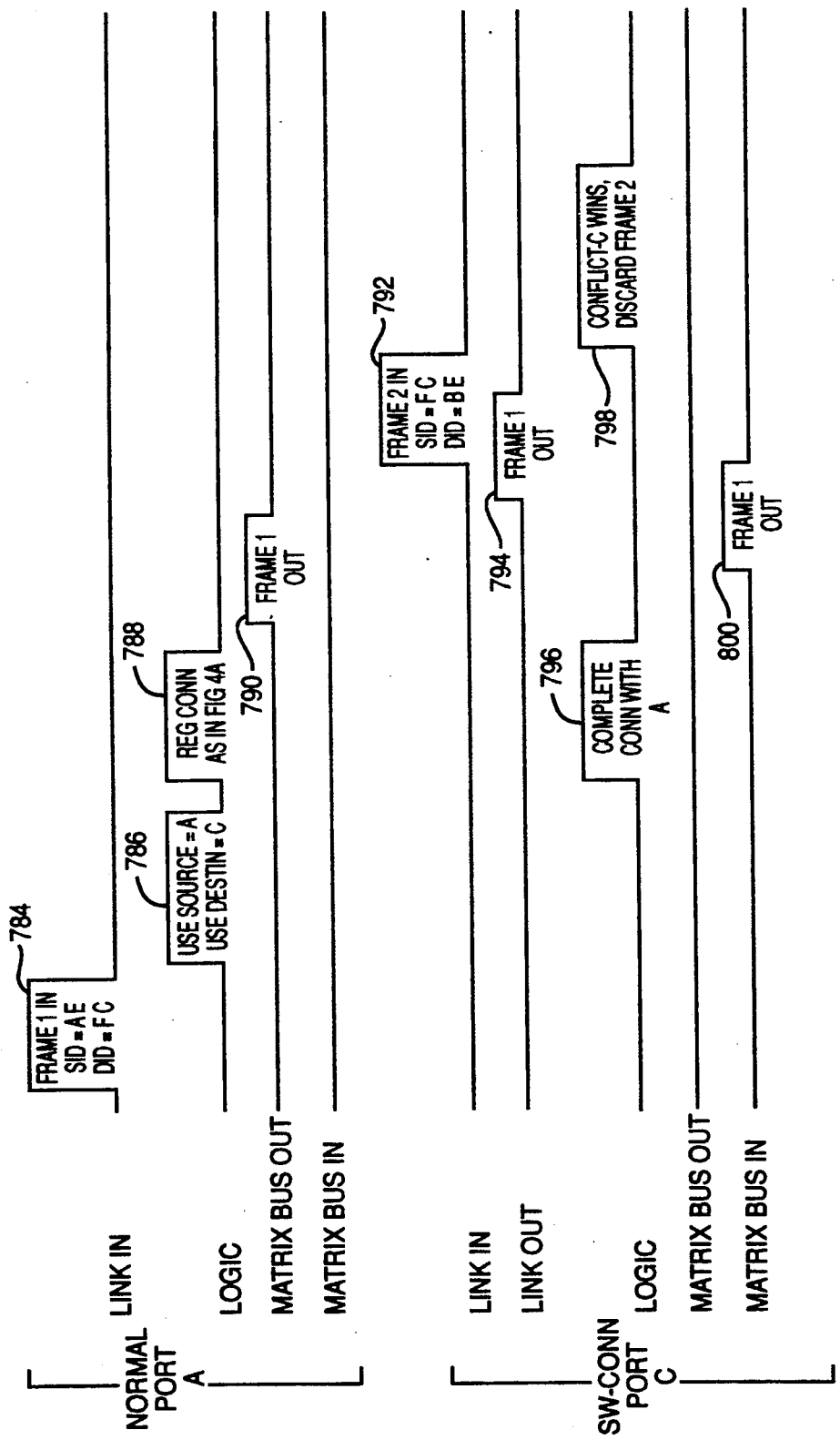
FIG. 4F is an event diagram in accordance with the subject invention.
Figure 4G:
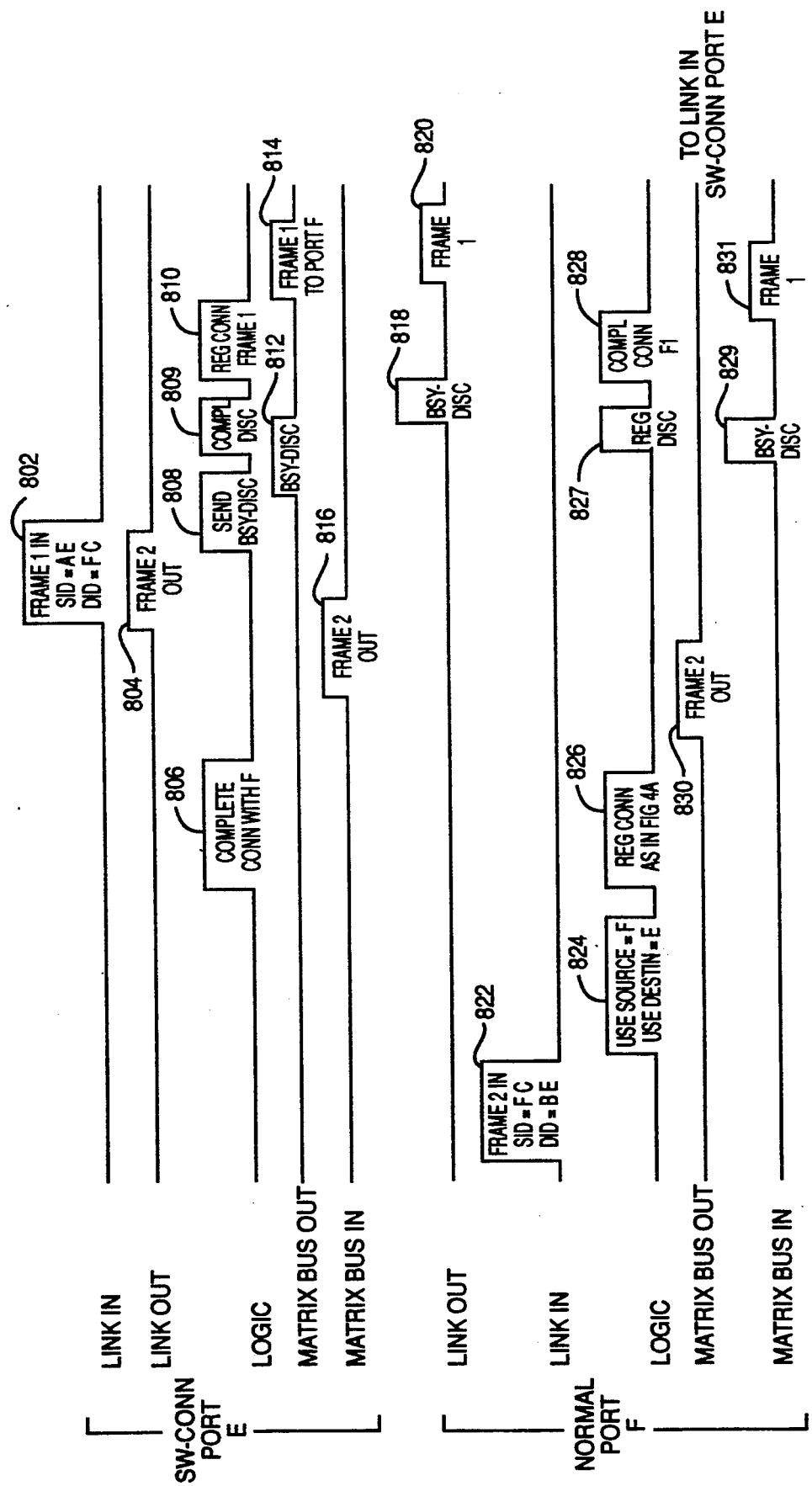

FIG. 4E illustrates a communications collision condition. This is a condition where a system, such as system 16, is attempting to communicate through the cascaded switches (switch 10 and 12) to system 20 at the same time system 20 is attempting to communicate through the cascaded switches 10 and 12 to system 18. This illustrates another aspect of the present invention is providing the switch port interconnection with priorities. In this example of the preferred embodiment, the two switch connected ports, port C of switch 10 and port E of switch 12, both have priorities relative to each other. In this example, port C has a higher priority than port E. At event 784, frame 1 is received by port A with the source identification of "AE" and destination identification of "FC". As previously discussed, port A logic determines in event 786 that the source identification to be used is A and the destination identification to be used is C, and at event 788, attempts to establish a communications link with port C. At event 796, port C completes the handshake over the control buses previously discussed and the communications link between the ports has been established over the matrix 40. At event 790, port A sends out the frame to the matrix. This is received from the matrix by port C at event 800.

Referring now to port F and port E at the same time frame 1 was being transmitted to port A, frame 2 was being transmitted to port F at event 822. Port F logic receives the frame and determines that the source identification is F and the destination identification is E. thus attempting to establish a communications link with port E through its matrix at event 826. At event 806 port E responds establishing interconnection through the matrix. Therefore, port F at event 830 sends frame 2 out over its matrix out bus which is received by port E on its matrix in bus at event 816.

Returning to port C, port C then attempts to send frame 1 out on its serial link connection at event 794 to port E. This is received by port E on its serial link in connection at event 802. Meanwhile, port E is sending frame 2 out at event 804 on its link out connection to port C which is received by port C at event 792. The collision has occurred. At that point, the logic in port C and the logic in port F then determine (1) that a collision has occurred and (2) determine that the high priority port should gain the link access and that access should be denied to the other port. In our example, port C is a high priority port, thus C wins the conflict and frame 2 is discarded by port C at event 798. At that time, port E control logic determines that port C is going to win and determines to send a busy disconnect signal back through the matrix at event 812 to port F. Port F receives the frame at event 829 and recognizing the disconnect delimiter it requests removal of the connection with port E at event 827. Port E responds at event 809. Port F then passes the busy frame to system 20 at event 818. Following removal of the connection, port E requests a connection associated with frame 1 at event 810. At event 828, port F completes the connection and port E passes the frame 1 to port F at event 814. Port F receives the frame at event 831 and passes it to system 20 at event 820.

FIG. 5 is a flow diagram for controlling the link in portion of a port. First, the control determines in step 832 whether it is a normal port (system connected) or whether it is connected to a switch. If the port is a normal port then in step 834 the port determines whether or not it is busy or connected. If the port is busy or already connected the logic proceeds to step 864. However, if it is not busy, it proceeds to step 842 and determines to use the first source identifier. If the second destination identifier is 0, it uses the first destination identifier, otherwise, it uses the second destination identifier. Therefore, in step 850, the control logic of the port requests a connection through the control bus with the port designated by the destination identifier. In step 858, the control logic determines whether or not this connection has been completed. If not, it proceeds to step 864 to send a busy signal and a disconnect indication in the end of frame delimiter. However, if the connection has been made, in step 862 the frame is passed to the matrix. The operation of a normally connected port is further discussed in the copending patent applications previously referenced.

Returning to step 832, if the port is a switch connected port, the control logic proceeds to step 836 to determine whether or not the port is already connected. If the port is connected, it proceeds to step 838 to determine if there is a connect request. If not, the port proceeds to pass the received frame in step 840. Returning to step 838, if a connect request has been received, the port then determines whether or not it is a high priority port since a collision has been detected. If not, in step 848, the port sends a busy with a disconnect end of frame on its matrix out to its connected port and system. The control logic then proceeds to step 844. Returning to step 836, if the port is not connected, it proceeds to step 844 to determine if a connection request has been received. If not, the request is not recognized and it is discarded in step 852. However, if the request has been received in step 844 the control logic proceeds to step 856 and determines to use the second source identification and the first destination identification. Then, in step 860, the port attempts to establish a connection through the matrix to the destination port. In step 866, the control logic determines whether or not this connection has been completed. If not, it sends a busy with an end of frame with a disconnect indication in step 868. If so, it proceeds to step 870 to pass the frame.

FIG. 6 is a flow chart illustrating the operation of the port control logic connected to the control bus. In step 872, the logic determines if the request is a connect request. In step 874 it determines whether or not it is currently busy or connected. If yes, it responds negatively over the control bus in step 876. If not, then in step 878, it grants the request. In step 877, the logic checks to determine if the request is a disconnect from the port. If so, the request is granted in step 878.

The control operation for the matrix in connection is illustrated in FIG. 7. This logic determines in 880 whether an end of frame disconnect has been received. If not, it loops back. If so, it removes the connection through the matrix in step 882 and enters an inactive state in step 884.

While this invention has been described with reference to the illustrated embodiment, this description is not intended to be construed in a limiting sense. Various modifications of the illustrated embodiment, as well as other embodiments of the invention will become apparent to those persons skilled in the art upon reference to this description. It is, therefore, contemplated that these appended claims will cover any such modifications or embodiments as fall within the true scope of the invention.

I claim:

1. A serial link communications system comprising:
    (a) a first switch means connected to a plurality of devices for providing a serial link channel between any such first plurality of devices connected thereto;
    (b) a second switch means connected to a second plurality of devices for providing a serial communications channel between any two of the second plurality of devices; and
    (c) wherein said first switch means further includes a serial link connection providing data and control routing information to said second switch means and each of said switch means includes cascade switch means for providing a serial link channel between a device of said first plurality of devices and a device of said second plurality of devices.

2. A serial link communications system according to claim 1 wherein each switch means includes a port means for connecting the switch means to at least one of said connected devices or another switch means.

3. A serial link communications system according to claim 2, wherein each switch means includes a matrix switch connected to each port of the switch means.

4. A serial link communications system according to claim 3 wherein each switch means includes at least one port means connecting another switch means and said switch connecting port means being only connected to the serial link connected to a port means of the connected switch means.

5. A serial link communications system according to claim 4 wherein each switch means connected port means includes logic means for determining that either it or the other switch means port means is a higher priority for resolving data collisions.

6. A serial link communications system according to claim 5 wherein said port means logic means includes means for discarding a communications from its matrix switch when the other connected switch means port means is of a higher priority and information is being received from the higher priority port means.

7. A serial link communications system according to claim 6 wherein each device connected port means includes logic means for decoding incoming information to determine a source designation indicating the port means to which the information is intended and a destination port means for which the information is to be transmitted through the matrix switch.

8. A serial link communications system according to claim 7 wherein each device connected port means further includes logic means for decoding incoming information destined for a device connected to another switch means to determine two source designations, the first designating the receiving port means and the second designating the connected switch means receiving port, and two destinations designations, the first designating the switch connected port means and the second designating the connected switch means port that is to transfer the information to a device connected to the connected switch means.

9. A serial link communications system according to claim 8 wherein each switch connected port means includes logic means for determining which of the two source and destination designations are to be used in establishing a serial link communications channel in the connected switch means.

10. A serial link communications system comprising:
    (a) first switch including a plurality of first ports connected to at least one first device or through a switch serial link to a second switch and a matrix switch means connected to all first switch ports for providing a serial link channel connection between any two first switch ports;
    said second switch including a plurality of second ports connected to at least one second device or said switch serial link and a matrix switch means connected to all second switch ports for providing a serial link channel connection between any two second switch ports;

(c) said first switch connected to said second switch only by said switch serial link between a first switch port and a second switch port;

(d) said first switch including means for receiving initial information in a first switch port from said a first device specifying two source designations and two destination designations and means for establishing from said receiving port designated by a first source designation a serial link connection providing data and control routing information through said matrix switch means to a second port of said first switch designated by a first destination designation and wherein said second port is connected to said serial link to said second switch; and (e) said second switch including means for establishing from a first port of said second switch connected to said serial link and designated by a second source designation a serial link connection providing data and control routing information through a second matrix switch to a second switch second port designated by a second destination designation.

11. In a serial link communications system including at least two switches, each switch including a plurality of ports connected to a matrix switch providing a serial link channel between any two connected ports and at least two switches interconnected by a serial link providing data and control routing information, a method for establishing a continuous serial link channel between a first device connected to a first switch and a second device connected to a second switch, said method comprising the steps of:

(a) receiving first device information in a first port of a first switch specifying a serial link channel to a device connected to a second port of a second switch;

(b) establishing a serial link channel connection through said first switch to said second switch on said serial link providing data and control routing information; and (c) establishing a remaining serial link connection from the first switch serial link providing data and control routing information through said second switch to said second device.

12. In a serial link communication system including at least two switches, each switch including a port connected to at least one device and a port connected to another switch and a matrix switch connected to all switch ports, a method for establishing a continuous serial link providing data and control routing information between a first device connected to a first switch and a second device connected to a second switch, said method comprising the steps of:

(a) receiving initial information in a first switch port from said device specifying two source designations and two destination designations;

(b) establishing from said receiving port designated by a first source designation a serial link channel connection through a first matrix switch to a port designated by a first destination designation, said second port connected only by a serial link channel to said second switch; and (c) establishing from a first port of said second switch designated by a second source designation a serial link connection providing data and control routing information through a second matrix switch to a second switch second port designated by a second destination designation.

13. A serial link communications system comprising:

(a) a first switch including a plurality of first ports connected to a first matrix switch means for providing a serial link channel between any two first ports;

(b) a second switch including a plurality of second ports connected to a second matrix switch means for providing a serial link channel connection between any two second ports;

(c) said first switch connected to said second switch by a serial link providing data and control routing information between a first switch port and a second switch port;

(d) said first switch including means for receiving first device information specifying a serial link connection providing data and control routing information to a device connected to said second switch and means for establishing a serial link channel connection through said first switch to said second switch; and (e) said second switch including means for establishing a remaining serial link connection providing data and control routing information from the first switch through said second switch to said second device.

* * * * *

UNITED STATES PATENT AND TRADEMARK OFFICE
CERTIFICATE OF CORRECTION

PATENT NO. : 5,144,293

DATED : September 1, 1992

INVENTOR(S) : Gerald L. Rouse

It is certified that error appears in the above-identified patent and that said Letters Patent is hereby corrected as shown below:

Title page item [75] Inventor: please delete "Gerlad" and insert
--Gerald--.

Signed and Sealed this

Ninth Day of November, 1993

Attest:

BRUCE LEHMAN

*Attesting Officer*  Commissioner of Patents and Trademarks